Dec. 4, 1928.  1,694,062

K. L. HANSEN

DYNAMOELECTRIC MACHINE

Filed Oct. 27, 1927  3 Sheets-Sheet 1

Inventor:
Klaus L. Hansen
By ........
Attorneys

Dec. 4, 1928.
K. L. HANSEN
1,694,062
DYNAMOELECTRIC MACHINE
Filed Oct. 27, 1927    3 Sheets-Sheet 2
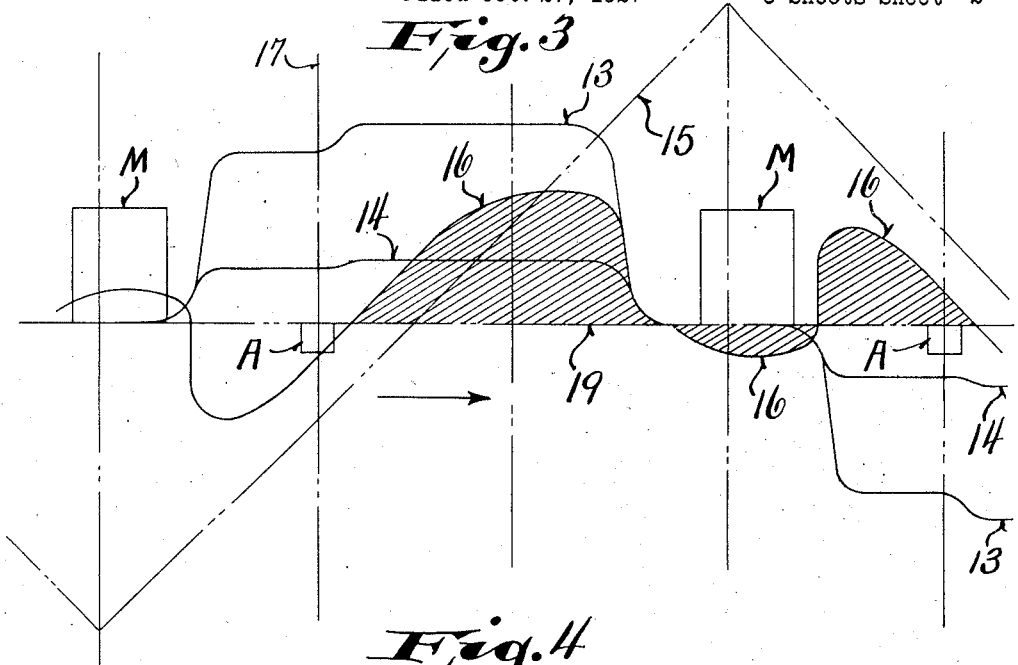
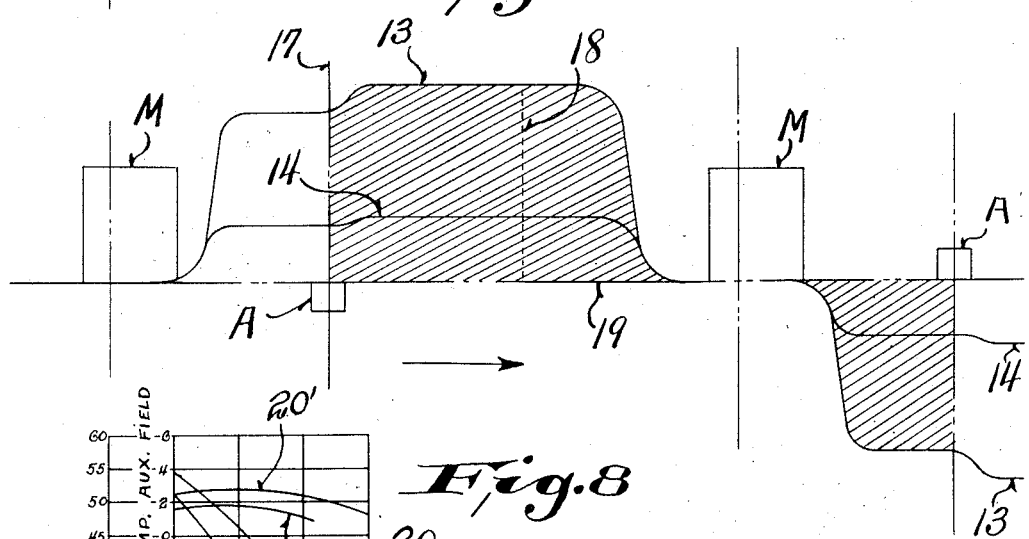
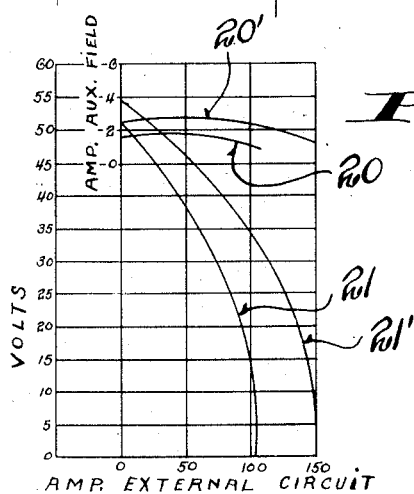

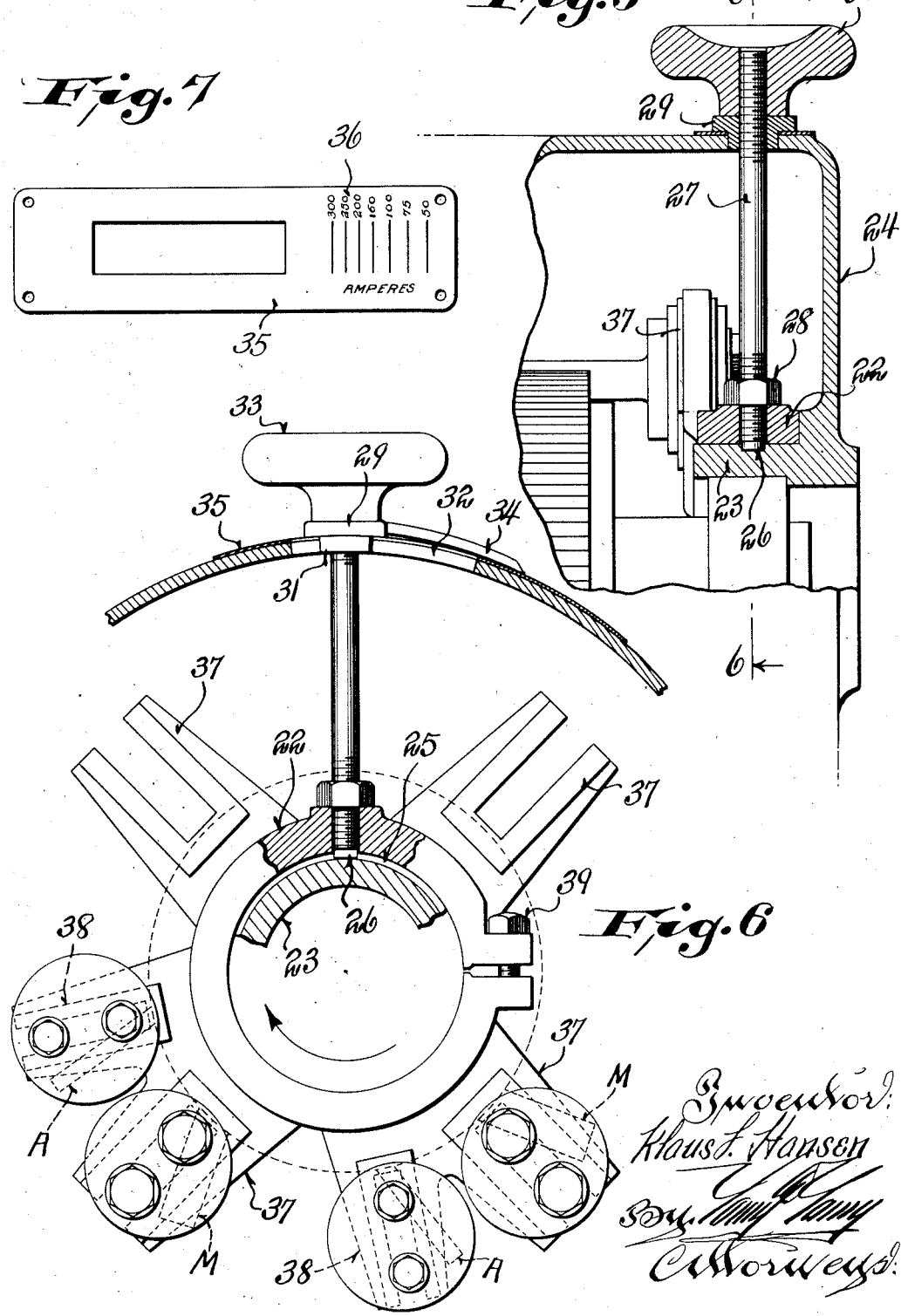

Patented Dec. 4, 1928.

1,694,062

UNITED STATES PATENT OFFICE.

KLAUS L. HANSEN, OF MILWAUKEE, WISCONSIN.

DYNAMO-ELECTRIC MACHINE.

Application filed October 27, 1927. Serial No. 229,080.

This invention relates to dynamo-electric machines.

In dynamo-electric machines, such for example, as arc welding generators, it is the usual practice to provide a direct current generator with a shunt field and a separately excited field, and to provide also an external inductance and a separate exciter for the separately excited field. This equipment is necessarily expensive as there are numerous devices, as stated above, which accompany the generator and add to the total cost of the welding equipment.

In my Patent No. 1,418,707 of June 6, 1922, for constant current generator for arc welding, I have disclosed a generator in which an auxiliary winding is provided which accentuates the reactance of the circuit and dispenses with the necessity for an outside or extra reactance.

It is apparent that in a machine of this type if the generator could be so constructed that a constant or substantially constant voltage was impressed on a second field in addition to the ordinary shunt field for any given setting, that the necessity for a separate exciter would be eliminated. By the construction outlined hereinafter it will be apparent that the above desirable result has been accomplished and therefore a primary object of this invention is to provide a novel form of arc welding generator in which a main field is provided and a second field excited directly from the generator itself and the winding thereof supplied with current at a substantially constant voltage for any given setting.

Further objects are to provide a novel form of arc welding generator in which the outside reactance is wholly avoided as well as the separate exciter, so that the generator embodies in itself inherently all of the desirable features ordinarily furnished by a plurality of separate instrumentalities, as discussed above.

Further objects are to provide a novel form of arc welding generator in which auxiliary brushes are set in spaced relation to the main brushes and in which the armature reaction is employed to combine with or distort the field furnished jointly by the main winding and the auxiliary winding, so that the total flux between active auxiliary brushes remains approximately constant from no load through full load to short circuit for any given setting. This, therefore, gives a substantially constant voltage for any given setting for producing the auxiliary field and thus the necessity of a separate exciter is overcome.

Further objects are to provide a construction such that the difference in voltage between the adjacent commutator bars as they pass the auxiliary brushes is reduced to a minimum so that destructive sparking is wholly avoided.

More specifically, objects of this invention are to provide a novel form of arc welding generator in which interpoles or commutating poles are associated with a reactance and then cooperate with the main poles to provide the necessary reactance for the main circuit, and in which this construction is combined with the auxiliary field and the auxiliary brushes to secure efficient commutation both at the auxiliary brushes and at the main brushes while maintaining a substantially constant voltage at the terminals of the auxiliary field winding for any given setting.

It is well known that in an arc welding generator employing a separately excited field, the welding current may be varied by varying the current in the separately excited field. This is easily accomplished by a rheostat in the separately excited field circuit. However, if the welding current is regulated in this manner the open circuit voltage of the machine varies simultaneously with the welding current and this variation of open circuit voltage extends over quite a wide range.

Further, it is to be noted that the welding current may be reduced by producing a strong demagnetization of the field, the demagnetizing effect being proportional to the welding current. The demagnetization may be produced by a differential series field or in a more economical and simpler manner by shifting the brushes in the direction of rotation, thus producing a demagnetizing component of armature reaction. If regulation of the welding current is obtained solely through armature reaction by shifting the brushes, the volt ampere, or external characteristic would show the open circuit voltage substantially the same for all welding current curves. In other words, the open circuit voltage would remain substantially constant throughout the entire range.

Neither one of these conditions alone is satisfactory, and a further object of this invention is to provide a novel means of simultaneously varying the welding current and the open circuit voltage while holding the open circuit voltage within a small range, considerably less than that secured by merely changing the rheostat as described above, so that there is a proportionate though considerably smaller variation of open circuit voltage with a variation in welding current. It has been found through actual practice that this condition is very desirable in welding. If, on the one hand, regulation is secured solely by shifting the brushes, the arc has not the striking qualities nor the stability in starting or in maintaining itself as is necessary in welding. On the other hand if regulation is secured solely by varying the separate excitation, it has been found that the arc is too violent, particularly at low values of welding current.

This invention, therefore, fulfills both the requirements enumerated above and objects of this invention are further to provide a single means for simultaneously controlling both the value of the separate excitation and the value of the demagnetizing armature reaction so that the desirable characteristics discussed above are obtained by a single setting of the controlling means.

More specifically, objects of this invention are to so organize or construct the dynamo-electric machine that the control is secured solely by shifting the brushes, but such control does not have the characteristics discussed in reference to the common practice of solely shifting the brushes, but instead produces a variation of open circuit voltage less than that produced solely by regulating the field strength and yet of sufficient extent to provide a stable arc and one having the desirable characteristics even with low welding currents.

This invention is an improvement over that disclosed in my co-pending application for dynamo-electric machines, filed April 27, 1927, Serial No. 186,941.

An embodiment of the invention is shown in the accompanying drawings in which:

Figure 3 illustrates a series of curves showing the action of the machine under load;

Figure 4 is a corresponding view showing the machine at no load;

Figure 5 is a detail of the construction of brush shifting means;

Figure 6 is a view partly in section taken on the line 6—6 of Figure 5 showing the brush shifting means;

Figure 7 is a detail showing the scale plate cooperating with the brush shifting means;

Figure 8 shows two pairs or sets of curves, ampere characteristics of the machine and the other curve of each set showing the corresponding current flow through the auxiliary exciting winding, the two pairs of curves showing different settings.

Figure 1:
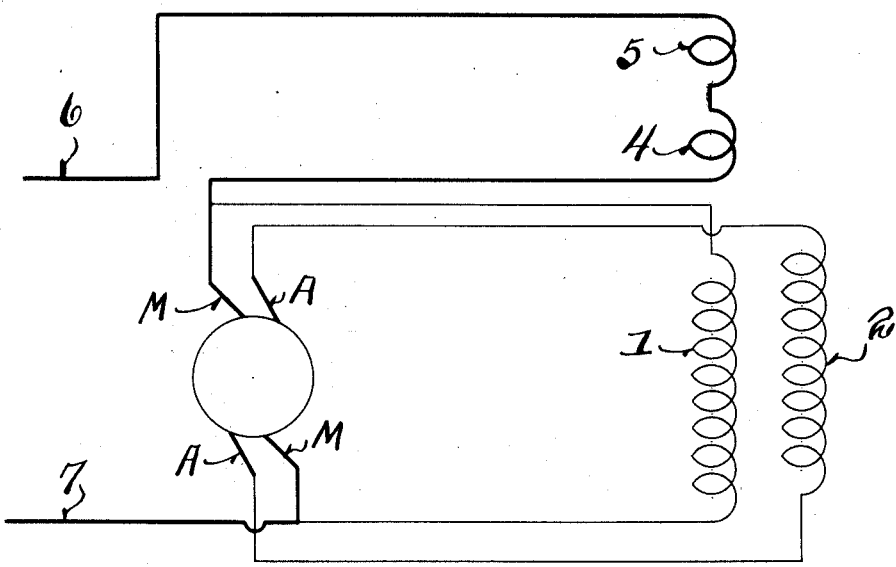
Figure 1 is a diagram of the connections and circuits employed in the machine.
Figure 2:
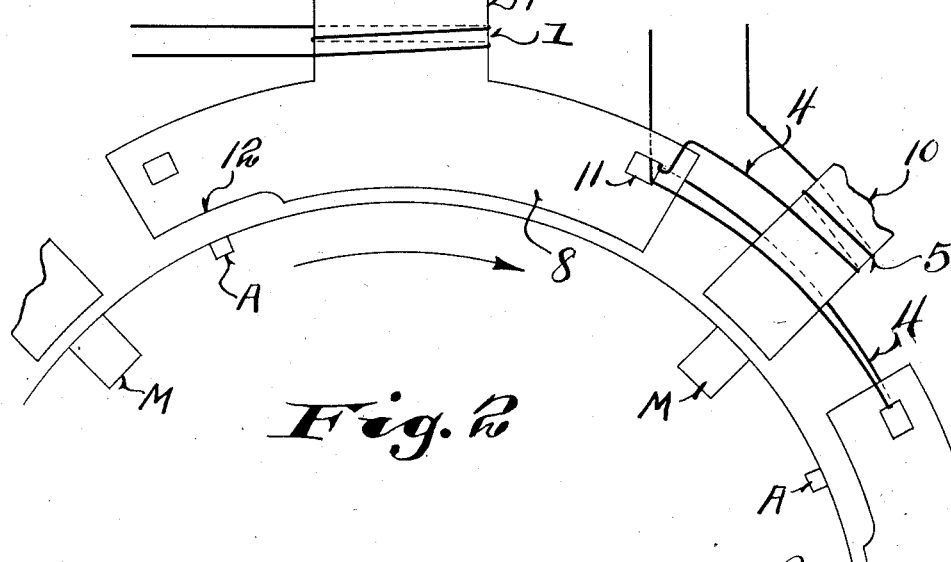
Figure 2 is a schematic view of a portion of the machine showing the windings thereon.

Referring to Figures 1 and 2, it will be seen that the machine is provided with a pair of main brushes M and a pair of auxiliary brushes A. The main brushes M are connected to a shunt coil 1, and the auxiliary brushes A are connected to an auxiliary exciting coil 2 which will hereinafter be referred to as the auxiliary winding.

The main circuit for the generator includes, in series with the armature, a reactance increasing winding 4, which will hereinafter be referred to as the reactance winding, and an interpole or commutating winding 5. These windings are connected, as stated, in series with the armature and in series with the conductors or load circuits 6 and 7 extending from the machine and leading to the welding electrodes. The mechanical construction of the machine includes a plurality of pole pieces having elongated shoes 8, as shown in Figure 2, and relatively smaller necks 9.

Further, commutating poles or interpoles 10 are provided upon which the windings 5 are placed. It is to be noted also that the poles or pole shoes are provided with apertures 11 adjacent their ends through which the reactance winding 4 is threaded. It is preferable to form these apertures in the pole shoes themselves to secure a large value for the reactance, and also to secure a pronounced effect upon the distribution of flux in the pole shoes. The construction is somewhat similar to that described and illustrated in my prior patent noted above.

Each pole shoe 8 may be provided with a notch or cutout portion 12 adjacent one end below which the auxiliary brush A corresponding thereto is positioned. If a notch or cutout is used, the actual flux at the effective conductors short circuited by the brushes A is considerably reduced and the voltage between adjacent commutator bars has a low value at the instant of passing the auxiliary brushes. Correct commutation, however, can be secured by using a relatively high number of bars, so that the voltage between adjacent commutator bars is reduced to a relatively low value. The main brushes M are located in proper relation to the commutating poles 10 to secure correct commutation without sparking at the commutating bars. This, of course, is secured by having substantially zero potential between the effective conductors short circuited by the main brushes, and is readily attained by proportioning and properly designing the commutating poles.

Further, it is to be noted that the reactance winding 4 encloses the commutating poles mutating windings may have fewer turns. The effect of the reactance winding is to greatly increase the reactance of the main circuit, and as a secondary effect, to enhance the action of the commutating poles, so that the commutating windings need be of a lesser number of turns. In fact, the windings 4 may be slightly increased and the windings 5 discarded, thus depending solely upon the windings 4 for energization of the commutating poles.

It is to be noted particularly that the auxiliary brushes A are not detrimental to the correct commutation of the machine, but work without sparking and without short circuiting any adjacent commutator bars having a material difference of potential between them.

The action of the machine will be most readily understood by reference to Figures 3 and 4, which will be discussed in detail herewith.

Referring to Figures 3 and 4, it will be seen that a series of curves have been given for illustrating the action of the machine. The curve 13 indicates the flux produced jointly by the main field winding and the auxiliary field winding, such flux being also influenced by the interpole or communicating pole winding and the reactance winding, as shown. This flux, as stated, is made up jointly by the action of the main field and the auxiliary field. The portion of the flux furnished by the auxiliary field is indicated by the curve 14.

When short circuiting occurs, it is clear that the flux produced by the main field will drop to approximately zero. This invention, however, provides for a substantially constant M. M. F. from the auxiliary winding 2 for any given setting. This is accomplished by utilizing the armature reaction and combining it with the field flux in a novel manner. The flux due to the armature reaction is indicated by the curve 15.

Assume now that the external circuit of the dynamo is short circuited or has substantially no resistance in it. Under these conditions, the flux produced by the armature reaction and that indicated by the reference character 14 will combine to produce the distribution of flux indicated by the curve 16. It is clear that the flux effectively included between the auxiliary brushes A is that shown by the shaded portion of Figure 3. If the algebraic sum of this flux is equal to the algebraic sum of the flux effective between the auxiliary brushes at open circuit or no load, it is clear that the voltage impressed on the auxiliary winding, that is to say, the voltage at the auxiliary brushes, will remain substantially constant and consequently the current flow and M. M. F. of the auxiliary winding will be substantially constant.

Figure 4 shows the curves 13 and 14, and the shaded area under the curve 13 between the auxiliary brushes A shows the effective flux between such brushes. It is clear from a comparison of Figures 3 and 4 that the algebraic sum of the flux effected between the auxiliary brushes under the condition shown in Figure 4 and corresponding to no load, is the difference between the two shaded areas, that is to say, is the shaded area under the curve 13 between the lines 17 and 18 (see Figure 4). This shaded area is approximately equal to the algebraic sum of the shaded area included between the curve 16, (Figure 3) and the zero line 19, and consequently the voltage at the auxiliary brushes is substantially constant. Clearly, therefore, the current flow through the auxiliary winding is also substantially constant, and thus the M. M. F. produced by such auxiliary field winding is substantially constant for any given setting.

Thus, it is immediately apparent that the machine functions identically as if the auxiliary field winding were supplied from a separate exciter and the desirable drooping external characteristics of the arc welding machine without any reentrant portion is obtained, as shown in Figure 8, and described in greater detail hereinafter.

It is apparent from the description thus far given that if the main brushes and the auxiliary brushes are simultaneously shifted that the machine will have the characteristics of both shifting the brushes of an ordinary separately excited welder when this shifting of the brushes is supplemented by a manual adjustment of the resistance in the separately excited field winding circuit. However, the necessity for a rheostat adjustment and a separate excitation is wholly avoided by this invention and it has been found by actual tests that with a machine constructed in accordance with the disclosure given thus far, that the characteristics so much desired and discussed immediately above may be secured solely through the medium of simultaneously shifting both sets of brushes.

Figure 8 shows a set of curves which indicate the operation of the machine and which corresponds to actual tests. For example, curve 20 shows the field current in the winding 2 and the curve 21 corresponding thereto shows the external volt ampere characteristic. It will be seen that the field current scarcely varies or at least varies through a very small amount and at the same time it will be seen that the drooping characteristics of the volt ampere curve of the external circuit is obtained.

It will be seen also that with a new setting of the brushes, as shown by the curves 20' and 21', that a new external characteristic is secured and a new current curve for the coil 2. The machine acts as if it were separately excited and provided with a manually controlled rheostat in the separately excited field circuit and as if it also were provided with shiftable brushes. Both these results are secured solely by shifting both the auxiliary and the main brushes. In regard to the curve 20, it will be seen that there is only a slight variation in the current flow through the external field circuit from no load to full load. Also from the curve 21, it will be seen that the external characteristic curve of the machine obeys the requirements of a stable arc welder. The curves 21 and 21' do not end at the same points on open circuit. In fact, all of the external characteristic curves end in a very limited region as shown by the two indicated. Thus, there is a variation in the voltage when there is a variation in the setting. Thus, it will be seen that the control secured solely by shifting the brushes gives the desired external characteristics of the machine and gives a restricted variation in the open circuit voltage for different settings. This entire range, however, is materially less in extent than the range in variation of open circuit voltage where the ordinary machine depends solely upon varying the field rheostat and is separately excited, as previously discussed.

Further, it will be seen that the range in variation of open circuit voltage secured by this machine makes it differ from the external characteristic of a machine as ordinarily constructed which depends solely upon the shifting of the brushes, as this shifting of the brushes in an ordinary machine causes all of the external characteristic curves to arrive at the same point at open circuit as is well known.

In other words, the machine constructed according to this invention secures a slight range in variation for open circuit voltages for different settings of welding current. Also, it will be seen that the machine produces a condition which insures a stable arc under all conditions.

It is apparent that the voltage across the field coil 2 is dependent upon the area enclosed in the rectangle between the line 13 and the base line 19, and between the lines 17 and 18 (see Figure 4). Obviously, shifting the brushes varies the enclosed shaded area in this rough rectangle and consequently varies the voltage impressed upon the coil 2. This result is secured, it will be noted, solely by shifting both of the brushes. This controls the open circuit voltage as will be immediately apparent from the preceding description of the curves shown in Figures 3 and 4.

Further, it is apparent that under load the voltage impressed upon the field coil 2 is proportional to the algebraic sum of the areas included between the zero line 19 and the curve 16 between the auxiliary brushes A (see Figure 3). This voltage is approximately equal to the open circuit voltage as the area discussed immediately above is approximately equal to the area included between the curve 13, the zero line 19, and the lines 17 and 18 of Figure 4.

The means for shifting the brushes may take different forms. One form is illustrated in Figures 5 and 6. From these figures, it will be seen that a brush holder having a hub 22 is mounted upon the inturned flange 23 of the end head 24 of the machine. Further, a slot or groove 25 is formed in the flange 23. This slot receives the reduced end 26 of a pin or rod 27. The rod 27 is threaded through the hub 22 of the brush shifter, as shown in Figures 5 and 6, and is locked thereto by means of the lock nut 28. The rod 27 extends upwardly through the cylindrical shell of the head 24 and passes through a fitting 29. This fitting is provided with an enlarged flanged portion which rides upon the outer face of the head and with a reduced portion 31 which fits within a slot 32 formed in the head. The upper end of the rod 27 is threaded and receives the hand wheel 33 by means of which the brush shifter may be clamped in any desired position. The fitting is provided with an extension 34 which rides upon a scale plate 35 (see Figures 6 and 7) secured to the cylindrical portion of the head or casing 24. This plate is provided with graduations, as indicated at 36, with any of which the sharpened edge of the indicating finger or extension 34 may be aligned. The graduations 36 indicate the approximate welding current that the machine will generate for any particular setting.

The brush holder is provided with a plurality of prongs 37 which receive the brush mechanism, as shown in Figure 6. The members 37 receive the main brushes, two of which are indicated by dotted lines by the reference character M. There is one brush holder and one brush for each main pole of the machine. In addition to these brush holders there are the prongs or members 38 which constitute brush holders for the auxiliary brushes A. It is to be distinctly understood that the main brushes are exactly equal in number to the number of main field poles. Further, it is only necessary to have two auxiliary brushes.

Returning to the mechanical construction of the brush shifter, it is to be noted that the hub 22 is split and is provided with a clamping bolt 39 by means of which the friction between the hub and the portion 23 may be controlled.

All that is necessary in setting this machine is to loosen the hand wheel 33 and move the pointer 34 to the indication desired corresponding to short circuit welding current and thereafter lock the hand wheel in place, thus locking the brush holders. The brushes, it will be noted, are all simultaneously moved including the auxiliary brushes, as well as the main brushes.

Further, the welding operator or welder does not have to worry about an adjustment of a field rheostat and also an adjustment of the brushes. The machine is so constructed that both of these effects are taken care of by the simple expedient of adjusting both the auxiliary and the main brushes.

It is to be noted also that even at approximately short circuit that the resulting flux indicated by the curve 16 is approximately zero at the auxiliary brushes A.

It will be seen that a novel form of dynamo electric machine has been provided by this invention which is so constructed that an auxiliary or separate exciter is not needed, but is wholly dispensed with.

Further, it will be seen that no external reactance is required in the smooth and perfect operation of the arc welding generator. Therefore, it is apparent that a novel form of dynamo-electric machine has been provided by this invention whose inherent characteristics give the effect of a separately excited arc welding generator with a high reactance in the arc welding circuit and with a shunt field as well as the auxiliary field, which latter corresponds to an externally excited field in its action in the machine. These characteristics are also combined with those of an interpole machine and provide perfect commutation at the main brushes and also with such characteristics as provide perfect commutation at the auxiliary brushes.

Further, it will be seen that a dynamo-electric machine has been provided having the characteristics above and in which the current flow in the auxiliary field winding is substantially constant from full load through short circuit.

It will be seen further that a welding generator has been provided in which the armature is wound for the same number of field poles as the actual number of field poles employed. Also, it will be seen that the functions of the main poles of the field structure are identical, that is, the main poles are not divided into two or more sets where the sets are subjected to different influences. Instead, all of the main field poles operate in identically the same manner and the armature is wound, as stated, for this full number of field poles.

It will be seen that an arc welding generator has been provided by means of which a simple single adjustment may be made which will produce an effect equivalent to a rheostat control of a separately excited field and also a shifting of the brushes. Instead of this elaborate adjustment, a single simple adjustment of all of the brushes produces these effects due to the novel design and mode of functioning of the machine.

Although the invention has been described in considerable detail, such description is intended as illustrative rather than limiting as the invention may be variously embodied and as the scope of such invention is to be determined as claimed.

I claim:

1. A dynamo-electric machine having an armature, a plurality of main brushes, a pair of auxiliary brushes, a main field winding supplied from said main brushes, an auxiliary field winding supplied from said auxiliary brushes, said machine impressing a substantially constant potential across the auxiliary field winding for any given setting, and means for simultaneously shifting both said main and auxiliary brushes.

2. A dynamo-electric machine having $n$ main field poles, an armature wound for $n$ poles, a plurality of main brushes, a pair of auxiliary brushes, a main field winding and an auxiliary field winding on each of said field poles, said main winding being supplied from said main brushes and said auxiliary winding being connected across said auxiliary brushes, and means for simultaneously shifting both sets of brushes.

3. A dynamo-electric machine having $n$ main field poles, $n$ main brushes, a pair of auxiliary brushes, an armature wound for $n$ poles, a main field winding and an auxiliary field winding on each of said field poles, said main winding being supplied from said main brushes and said auxiliary winding being connected across said auxiliary brushes, and means for shifting both sets of brushes.

4. A welding dynamo comprising a main field winding, an auxiliary field winding, an armature, main field brushes connected to said main field winding, means for supplying current to said auxiliary winding, and means for simultaneously varying the demagnetizing action of the armature and the voltage impressed upon the auxiliary field winding, whereby the welding current is varied and the open circuit voltage varied and kept within a predetermined range.

5. A unitary self-exciting dynamo-electric machine comprising field poles, an armature commutating means including main brushes and auxiliary brushes, a field winding, work circuit supplying conductors leading from said main brushes, said main field coil having its terminals connected to the main brushes, an auxiliary field winding having its terminals connected to the auxiliary brushes, said auxiliary brushes being shifted from a neutral position to a point at which a substantially constant voltage is maintained at the auxiliary brushes from no load to short circuit, commutating poles, and reactance increasing windings embedded in said main poles and surrounding said commutating poles, said reactance increasing windings being connected in series with said main brushes.

6. A dynamo-electric machine having an armature, commutating means including main and auxiliary brushes, main field poles, a field coil supplied from said main brushes, an auxiliary field coil supplied from said auxiliary brushes, one of each of said coils being positioned on each of said main field poles, said auxiliary brushes being set to utilize the armature reaction to maintain a substantially constant current through the auxiliary field coil from no load to short circuit, and a reactance increasing winding embedded in the field poles and connected in series with the circuit of said main brushes.

In testimony that I claim the foregoing I have hereunto set my hand at Milwaukee, in the county of Milwaukee and State of Wisconsin.

KLAUS L. HANSEN